United States Patent Office 2,807,587
Patented Sept. 24, 1957

---

2,807,587
BLUE ELECTROLUMINESCENT ZINC SULFIDE PHOSPHORS

Keith H. Butler, Marblehead, and Horace H. Homer, Arlington, Mass., assignors to Sylvania Electric Products Inc., Salem, Mass., a corporation of Massachusetts No Drawing. Application August 27, 1952, Serial No. 306,727

2 Claims. (Cl. 252—301.6)

This invention relates to electroluminescent phosphors, and especially to those giving blue emission.

Phosphors of that type have been described in our copending application Serial No. 230,712, filed June 8, 1951, now Patent No. 2,745,811, issued May 15, 1956, in which the blue color was obtained by using substantially chloride-free materials to form a zinc sulfide phosphor. We now find, however, that the brightness of such phosphors can be greatly increased by the addition of a small amount of chloride, without losing the blue emission color, as long as the amount of chloride used is small. About 0.03 to 0.15% by weight of chloride is a satisfactory amount in the starting mixture from which the phosphor is to be made by firing; this will give chloride contents of the order of 0.01% in the finished fired phosphor although the actual chloride content will depend on the copper content and the firing conditions.

The copper content should also be low to give the blue color; copper concentration above 0.001 gram-atom per mole of sulfide will give a greenish color at low chloride contents. However, with high chloride contents in the unfired mixture, of the order of 0.50% or higher, copper concentration as low as 0.0004 gram-atom per mole will give green phosphors.

The brightness of the resultant phosphor is greatly increased by the addition of a small amount of lead. About 0.0001 to 0.0020 gram-atom of lead per mole of sulfide can be added to the starting mixture, in the form of a carbonate, oxide, sulfate, acetate, nitrate or the like, although we prefer to keep the lead addition between 0.0002 and 0.0008 gram-atom. After firing, there should be about 0.000003 to 0.0001 gram atom of lead present per mole of zinc sulfide. The addition of a small amount of zinc oxide is also beneficial.

The effect of the chloride on a zinc sulfide phosphor activated with 0.0004 copper and 0.0004 lead taken as gram-atom of metal per mole of zinc sulfide, is shown below, both for the case of a mixture fired at 1760° F. for three-quarter hours, and for that of a mixture fired at 1760° F. for three-quarter hours, reground, and then fired at 1720° F. for three-quarter hours:

TABLE 1

| | Light output Relative units |
|---|---|
| Single firing at 1760° F.: | |
| Substantially no chloride | 98 |
| About 0.1% chloride | 400 |
| Double firing at 1760° F. and 1720° F.: | |
| Substantially no chloride | 220 |
| About 0.1% chloride | 960 |

The color shift due to the introduction of 0.1% chloride into the raw material mixture was barely noticeable and the same color was obtained with either single or double firing.

In addition to the beneficial effect on light output, we have found that the introduction of chloride also catalyzes the solution of copper in the zinc sulfide. The single-fired powders made without chloride are definitely mottled in appearance with many dark regions present in the cake, which disappear in the second firing. In contrast phosphors made with the controlled amount of chloride show only a very slight degree of mottling.

While it is convenient to use a dry blending method for the preparation of the raw material mixtures, we have found that this procedure results in a considerable degree of mottling even though the greatest degree of care is taken to insure an intimate mixture of the various constituents. We have found that the degree of mottling may be appreciably reduced by using a wet blending procedure. In this procedure, the zinc sulfide and zinc oxide are suspended in distilled water and mixed with a suitable agitator, while the activators, in the form of suitable soluble salts are dissolved in water either separately or together.

The water solutions are then added to the sulfide suspension while continuing agitation. In general the activators are immediately precipitated on the surface of the sulfide, but, as an added precaution, a little ammonium sulfide solution can be added to the solution or a little hydrogen sulfide passed through it to insure complete precipitation.

When both activators are dissolved and added simultaneously, acetates or nitrates are suitable, while if separate solutions are used, the copper may also be used as the sulfate. After completing the precipitation of the activators, the mixture may be evaporated to dryness at a temperature sufficiently low to prevent loss of chloride, or filtered and dried and then crushed. While this wet method of preparation is particularly useful for chloride-free phosphors, it may also be applied to those containing chloride provided that care is taken to compensate for loss of chloride in the filtrate.

It is also possible to dry mix the zinc sulfide with the zinc oxide and then moisten the mixture with solutions of soluble salts of the activating metals, copper and lead. The moistened material is then dried and dry mixed thoroughly before firing.

The mixture is then fired at a temperature between 1400° and 1900° F.

As mentioned above, we have found the chloride-containing blue phosphors are more sensitive to changes in copper concentration than are the chloride-free phosphors. However, we have found that a variation in copper content between .0003 and .0009 atom per mole of zinc sulfide can be allowed without departing appreciably from the blue color. Table 2 illustrates the effects found.

TABLE 2

Effect of copper concentration on phosphors fired at 1760° F. and refired at 1720° F.

| Blend | Chloride content of Zns mixture, percent by weight | Copper | Color | Light |
|---|---|---|---|---|
| C | 0.10 | .0004 | Deep blue | 570 |
| D | 0.10 | .0006 | Blue | 800 |
| E | 0.10 | .0008 | Greenish blue | 970 |

The procedures outlined above are found to be very effective in improving the brightness, decreasing the mottling of the fired cake, and in allowing minor variations in the color of the blue light obtained. Such variations are obtained by varying either the copper concentration or the chloride content of the mixture or by simultaneous variation of the copper and the chloride concentrations.

As one example of our improved method of manufacture we took the following raw materials and mixed them by dry blending in a tumbling barrel, followed by hammer-milling and mixing by rolling in a bottle.

| | Grams |
|---|---|
| Zinc sulfide containing 2.5% chloride | 25 |
| Zinc sulfide containing less than 0.01% chloride | 450 |
| Zince oxide | 20 |
| Copper oxide | 0.67 |
| Lead carbonate | 0.24 |

This blend was fired in silica boats, ¾ hours at 1760° F., with a gas flow counter current to the direction of travel of the powder and then crushed and refired ¾ hours at 1720° F. The light output of various samples varied from 750 to 850, averaging 800 units, on our arbitrary linear scale of measurement. A similar blend in which the zinc sulfide containing 2.5% chloride was replaced by the sulfide with 0.01% chloride was fired under the same conditions and gave a light output below 100 units.

What we claim is:

1. A blue-electroluminescent phosphor consisting essentially of a zinc sulfide phosphor containing lead activator in an amount between .000003 and .0001 gram-atom per mole of sulfide, between about 0.0002 and 0.008 gram-atom of copper activator per mole of sulfide, and containing chloride in an amount substantially less than the amount of copper and being about 0.01% by weight.

2. The method of making a blue-electroluminescent phosphor which includes the steps of mixing zinc sulfide containing between about 0.03% and 0.15% chloride by weight, with about 0.001 to about 0.002 gram-atom of lead per mole of zinc sulfide and about 0.0003 to about 0.0009 gram-atom of copper per mole of zinc sulfide, and of firing the mixture at a temperature between 1400° F. and 1900° F.

References Cited in the file of this patent

UNITED STATES PATENTS 2,447,322   Fonda _____ Aug. 17, 1948